Figure 1:
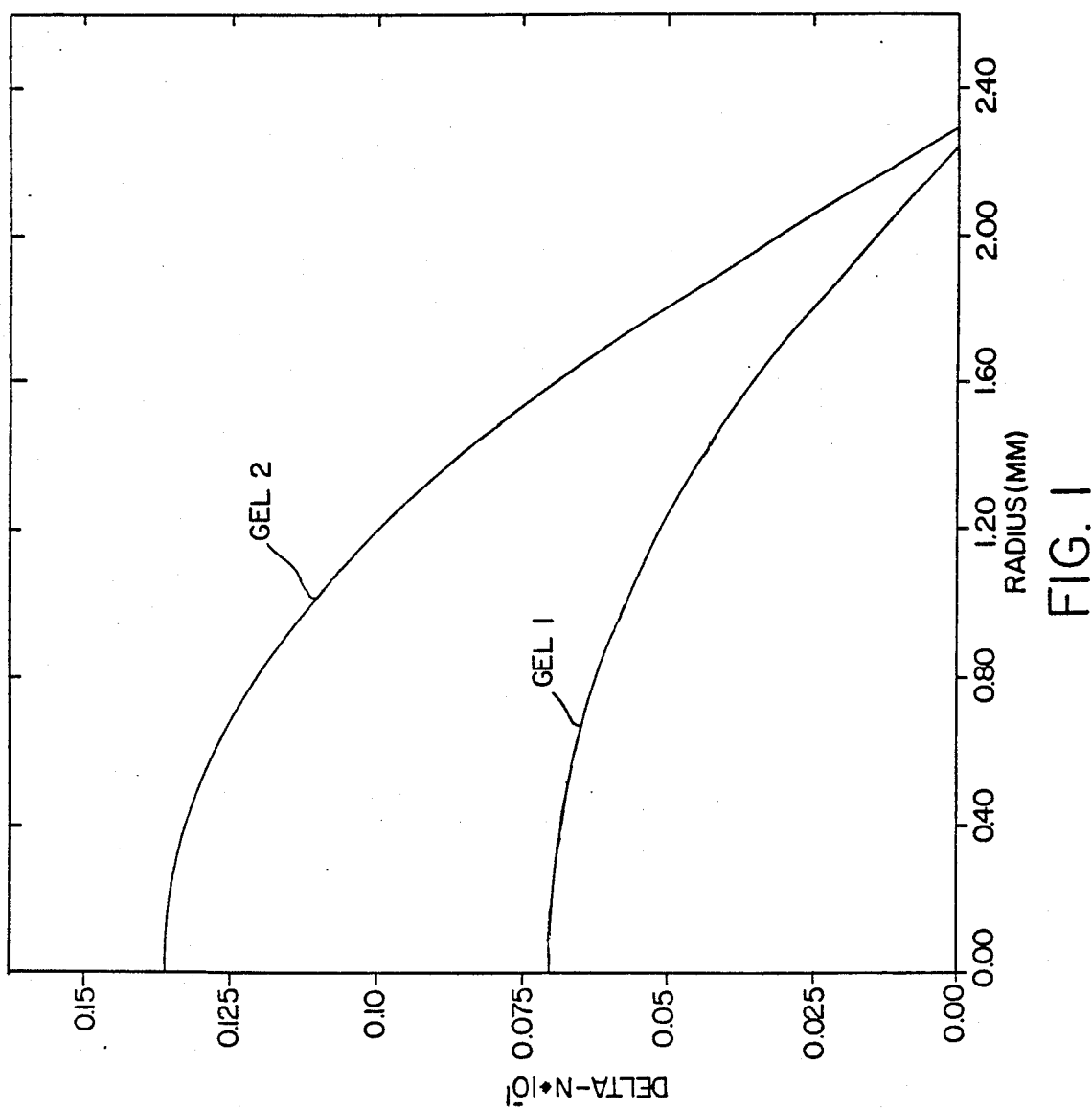

United States Patent [19]

Caldwell et al.

[11] Patent Number: 4,902,650
[45] Date of Patent: Feb. 20, 1990

[54] GRADIENT-INDEX GLASS

[75] Inventors: J. Brian Caldwell; Duncan T. Moore, both of Rochester, N.Y.

[73] Assignee: The University of Rochester, Rochester, N.Y.

[21] Appl. No.: 219,503

[22] Filed: Jul. 15, 1988

Related U.S. Application Data

[62] Division of Ser. No. 59,960, Jun. 9, 1987, Pat. No. 4,797,376.

[51] Int. Cl.$^4$ .................. C03C 4/00; C03C 3/076; C03C 3/083; C03C 3/089
[52] U.S. Cl. .................. 501/12; 501/55; 501/65; 501/66; 501/67; 501/68; 501/900
[58] Field of Search .................. 501/12, 55, 65, 66, 501/67, 68, 900

[56] References Cited

U.S. PATENT DOCUMENTS

| | | | |
|---|---|---|---|
| 4,439,008 | 3/1984 | Joormann et al. | 501/64 |
| 4,472,030 | 9/1984 | Tachibane et al. | 501/63 |
| 4,547,210 | 10/1985 | Schneider | 501/12 |
| 4,686,195 | 8/1987 | Yamane | 501/12 |

FOREIGN PATENT DOCUMENTS 58-120539  7/1983  Japan ................ 501/64

Primary Examiner—Mark L. Bell
Attorney, Agent, or Firm—Martin LuKacher

[57] ABSTRACT

A sol-gel method for making gradient-index glass and a novel composition therefor, comprising at least a ternary system of metal alkoxides.

5 Claims, 3 Drawing Sheets

GRADIENT-INDEX GLASS

FIELD OF THE INVENTION

This is a division of application Ser. No. 059,960 filed June 9, 1987, now U.S. Pat. No. 4,797,376, issued Jan. 10, 1989.

This invention relates to gradient-index glass having a novel composition therefor. More particularly, this invention relates to a novel gradient-index glass with a nearly parabolic index profile consisting of a system with three or more components.

BACKGROUND

Gradient-index glass is a glass in which the index of refraction varies spatially in a controlled manner. Often, optical elements made from such glass are cylindrical; and as such, the index changes in a radial fashion with the highest index located along the axis and the lowest index located at the outer surface. The total change in the index from the axis to the outer surface is referred to as delta-n.

A graph of index of refraction versus spatial position is commonly referred to as the index profile. The manner in which the index profile changes with different wavelengths of light is called the index profile dispersion. Delta-n, the shape of the index profile and the index profile dispersion are the three primary characteristics of a gradient-index glass.

The use of gradient-index glass in optical systems provides many advantages over homogeneous glass. These advantages include greater simplicity by reduction of the total number of optical elements in a system and improved performance. At the present time, however, lack of suitable materials limits the development and application of gradient-index optics. Drawbacks of currently available materials produced by ion-exchange techniques include small size, poor environmental and thermal stability, and a limited variety of optical characteristics such as index profile dispersion and base index of refraction.

Recently, a number of researchers have been pursuing a number of avenues for making gradient-index glass which utilize porous silicate performs. See, e.g., U.S. Pat. Nos. 3,938,974 and 4,302,231. These performs are fabricated either by leaching a phase-separated glass or by sol-gel methods. The essential method is first to create and then fix into place a concentration gradient of refractive index modifying dopants within the porous preform. The preform then is dried and heated until it becomes a pore-free glass element with an index gradient. These techniques have been reviewed by Yamane in U.S. Pat. Serial No. 820,486 filed Jan. 16, 1986, now U.S. Pat. No. 4,686,195, issued Aug. 11, 1987.

One method for producing gradient-index glass by a diffusion process in inorganic oxide gel monoliths was first proposed by Mukherjee in 1981. See Mukherjee, S.P., Gradient Index Lens Fabrication Processes: A Review, in Topical Meeting on Gradient-Index Optical Imaging Systems, May 4-5, 1981, Honolulu, Hawaii, Optical Society of America (1981). pages Tu A 1-1 to Tu A 1-5. No samples or results were presented, however. The potential advantages of using sol-gel precursors in the production of gradient-index glass include: 1) relatively large diffusion coefficients; 2) low energy consumption during most of the process; and 3) the ability to introduce a broad variety of index-modifying dopants into the sol-gel preform.

Yamane U.S. (Patent Serial No. 820,486) produced a crude gradient-index glass by a sol-gel technique. This technique involved mixing a silicon alkoxide with water, a source of boron oxide, and an aqueous metal salt solution which is the source of modifier cations. This mixture forms a gel which then is placed in a solution to leach out some of the metal salts contained within it and to have other metal salts introduced into it by diffusion. The gel then is dried and sintered into glass.

The main problem with this technique is that since the index modifiers are introduced as salts they are not incorporated into the structural network of the gel until it is heated to a high temperature. The modifier cations are thus free to migrate during the drying step, and this causes asymmetry in the final index profile.

Shingyouchi et al., *Electronics Letters*, technique than Yamane's. In this technique, germanium is the index modifying cation, but it is introduced as an alkoxide rather than as a salt. The index modifier thus is fully incorporated into the gel structure, and the index profile does not suffer from uncontrollable asymmetry.

First, tetramethoxy silane (a silicon alkoxide) is combined with tetraethoxy germanium (a germanium alkoxide), ethanol, water and hydrochloric acid. The mixture forms a gel which is placed in water to leach out some of the germanium component. The gel then is washed in methanol to fix the germanium concentration gradient, and then is dried and sintered into gradient-index glass. Shingyouchi et al. also used titanium to replace germanium as the index modifying cation. The resulting glass was a rod 2mm in diameter with a delta-n of 0.013.

The method of Shingyouchi et al. involves the use only of two components: silica and an index modifying oxide, such as germanium dioxide or titanium dioxide. The method can be generalized to substitute zirconium dioxide as well.

These binary systems, however, will yield gels which shrink considerably during drying. This large shrinkage results in a dense gel which is difficult to sinter without fracturing or bloating. The $SiO_2/TiO_2$ binary tends to crystallize at elevated temperatures if the $TiO_2$ content exceeds 4 to 5 mole percent. The $SiO2/ZrO2$ binary gels tend to bloat at elevated temperatures because the outside portions of the gel collapse before the inside portions, thereby trapping any released gases. As a result, the method and compositions disclosed by Shingyouchi et al. suffer from several flaws.

SUMMARY OF THE INVENTION

In this invention, the flaws of existing techniques and compositions are avoided. Asymmetry of the index profile is avoided by introducing the metal oxide precursors as alkoxides instead of as salts, and the difficulties inherent in binary metal oxide sol-gel systems are avoided by using three or more components.

Briefly described, the present invention utilizes several different gel components to form at least a ternary system in order to facilitate the production of large size gradient-index glass with a broader range of compositions and optical properties.

An alkoxide of silicon and at least two different metal alkoxides are added to form a mixture. The first of the alkoxides act as index modifiers and are selected from the group consisting of alkoxides of titanium and zirconrum. The second of the alkoxides act as gel modifiers and are selected from the group consisting of alkoxides of boron, aluminum and germanium. The resulting ternary or greater solution is allowed to gel. The gel is placed in a leaching bath, dried and then sintered to form a glass.

An object of this invention, therefore, is to provide an improved method and composition for a gradient-index glass which avoids problems encountered in other sol-gel methods.

It is an advantage of this invention that the gradient-index glass produced thereby will be large, have a high delta-n and a nearly parabolic index profile.

A further advantage of this invention is that the resulting glass will be relatively free from defects.

DRAWINGS DETAILED DESCRIPTION AND EXAMPLES

Figure 2:
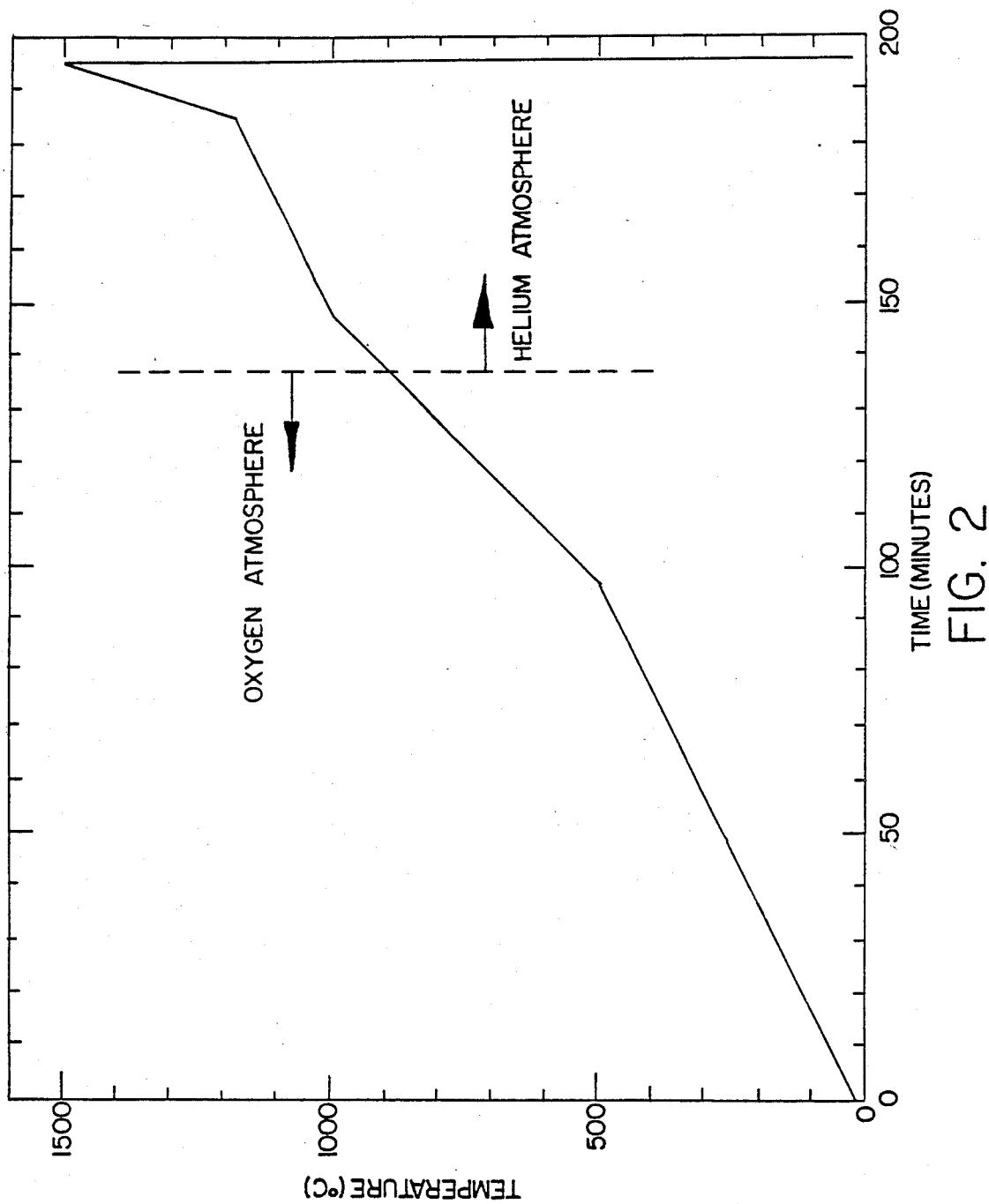
Figure 3:
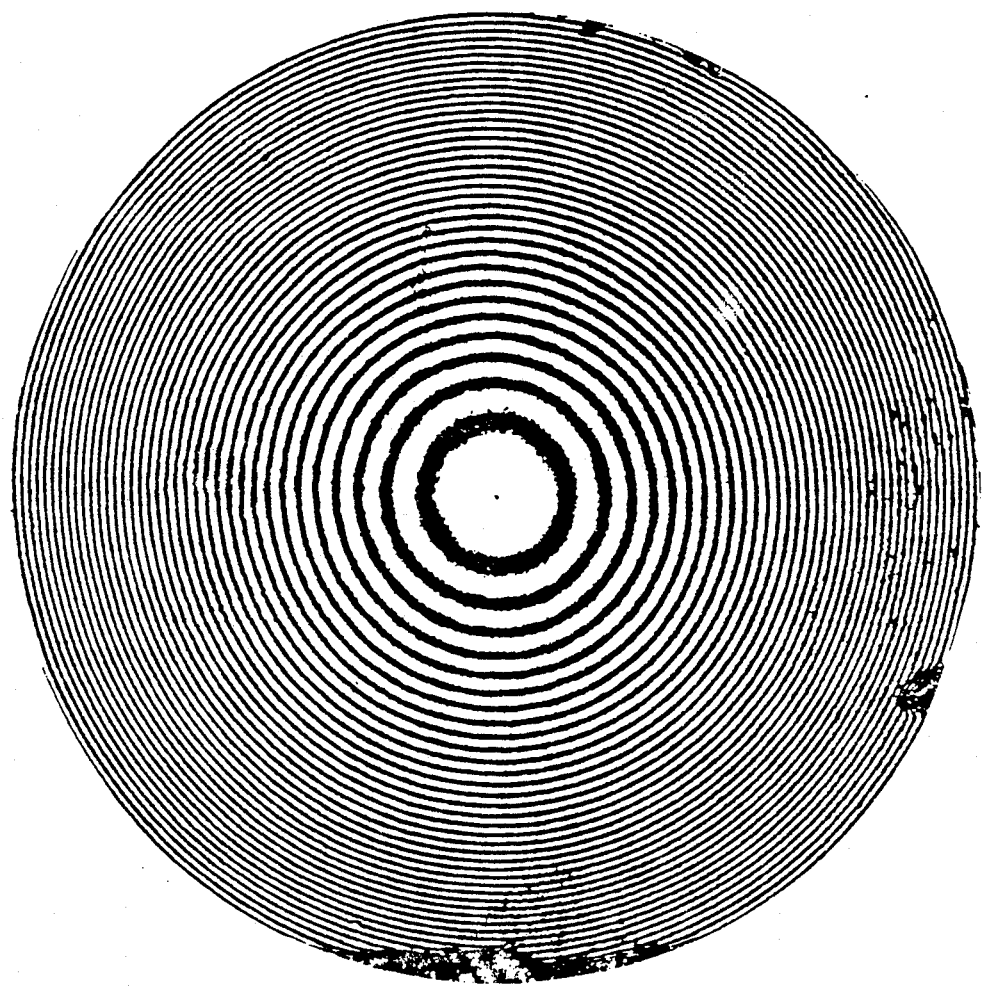

These and other objects and advantages of this invention will become more apparent from the following detailed description which makes reference to the following figures in which:

FIG. 1 is a plot of delta-n versus radius of a radial gradient element with its central axis at 0.00 radius FIG. 2 is a plot of temperature versus time for the sintering cycle; and FIG. 3 is a interferogram of a plane-faced disc element, cut and polished, using a Mach-Zehnder interferometer and an argon-ion laser operating at a wavelength of 0.5145 microns.

An alkoxide of silicon, diluted with alcohol, is partially hydrolyzed by adding a small amount of slightly acidic water to form a mixture. After the partial hydrolysis, at least two different metal alkoxides are added to the mixture. The first of the alkoxides act as index modifiers (or dopants) and are selected from the group consisting of titanium and zirconium. The second of the alkoxides act as gel modifiers and are selected from the group consisting of boron, aluminum and germanium. The resulting ternary or greater solution is stirred. Next, additional water is added to the alkoxide solution in order to facilitate its gelation. Prior to gelation, the solution is poured into a mold of the desired shape.

After the solution gels, it is allowed to age at a temperature between 20° C. and 100° C. for a period of time between 1 hour and several weeks. The aged gel is then placed in a leaching bath in order to leach out some of the index modifying dopant, thus creating a concentration profile of the dopant. The leaching bath consists of water and one or more acids selected from the group consisting of hydrochloric acid and sulfuric acid, nitric acid.

After leaching, the gel is placed in an alcoholic fixing bath, preferably comprising methanol or ethanol, in order to fix the concentration profile in place. The gel then is dried to produce a porous oxide body with a greater percentage of index modifying dopants at its center than at its edge. Referring to FIG. 2, the dry gel then is sintered into glass by controlled heating to a temperature between 800° C and 1600° C.

Gradient-index glass rods produced y this method can range in size from 0.5mm to 15mm. They also may have a delta-n up to 0.03. See FIG. 1. Finally, the gradient-index profile typically will be symmetrical and nearly parabolic in shape. See FIG. 3. The use of zirconium oxide as an index modifier will result in a lower index profile dispersion than when titanium oxide is used.

The addition of $Al_2O_3$ to the gel helps to eliminate all of the problems inherent in a binary system. Gels containing $Al_2O_3$ tend to have a lower density and coarser microstructure when they are dried. The coarse structure makes the dry gel more resistant to fracture while it is heated. It also allows gaseous reaction products formed during sintering to flow freely out of the gel, thus helping to avoid bloating. $Al_2O'$ tends to increase the temperature at which the gel collapses into glass, which means that the reactions which cause bloating are more likely to be completed before the gel collapses. When added to a gel containing $TiO_2$. helps to reduce the rate of crystallization and increase the temperature at which crystallization occurs.

The addition $B_2O$ the gel helps to eliminate bloating because the $B_2O_3$ gradient created during the leaching stage lowers the sintering temperature of the center of the gel relative to the outer portions of the gel. This means that the middle will sinter first, and released gases will therefore not be trapped within the collapsing gel. Also, $B_2O_3$ substantially reduces the tendency of a gel containing $TiO_2$ to crystallize at high temperature.

$GeO_2$, performs a similar function to B but in addition it makes a significant contribution to the total index change.

Tetramethoxy silane, or "TMOS", is the preferred silicon alkoxide for the source of silica in the gel. The preferred source of $B_2O_3$ is triethyl borate or tributyl borate. The preferred sources of $GeO_2$, $ZrO_2$, and $TiO_2$ are the ethoxides, propoxides, and butoxides of germanium, zirconium, and titanium, respectively. The preferred source of $Al_2O_3$ is aluminum di(sec-butoxide) acetoacetic ester chelate. The metal oxides ($SiO_2$, $TiO_2$, $ZrO_2$, $Al_2O_3$, and $GeO_2$) are formed from their corresponding metal alkoxides by hydrolysis and polycondensation reactions. These reactions lead to the formation of a highly porous oxide gel.

The amount of $SiO_2$ in the gel should be between 60 and 98 mole percent. Amounts less than 60% result in a gel which is too weak to withstand all of the processing steps. Amounts greater than 98% will not yield useful refractive index changes.

For gels incorporating $TiO_2$ as the main index modifier, the amount of $TiO_2$ in the gel should be at least 0.1 mole percent but less than 25 mole percent. For gels incorporating $ZrO_2$ as the main index modifier, the amount of $ZrO_2$ should also be at least 0.1 mole percent but less than 25 mole percent.ABcontaining more than 25% $TiO_2$ or $ZrO_2$ tend to dissolve during the leaching stage or crystallize during the sintering stage.

When $B_2O_3$, $Al_2O_3$ or $GeO_2$ are used as gel modifiers, the amount of $B_2O_3$ should be less than 10 mole percent, the amount of $Al_2O_3$ should be between 1 and 25 mole percent, and the amount of $GeO_2$ should be less than 20 mole percent.

The following are illustrative examples of specific embodiments of this invention.

EXAMPLE 1

9.13ml of TMOS, 30.97ml of methanol, and 1.38ml of a 0.1M aqueous solution of hydrochloric acid are stirred together for 30 minutes. 2.17ml of titanium isopropoxide and 2.20ml of aluminum di(sec-butoxide) acetoacetic ester chelate then are added and the mixture is stirred for 2 hours. 4.14ml of water then is added and the mixture is stirred for 10 to 15 minutes. The resulting solution is poured into four 15×90mm polypropylene test tubes which are immediately capped. The solution inside the test tubes forms a stiff gel within 3 hours at room temperature. The gels are kept closed inside the test tubes while they are aged for 1 day at 60° C.

The gels then are placed into glass test tubes containing 50ml of a 32.6% aqueous solution of sulfuric acid. The glass tubes are rotated end over end to provide thorough agitation. After 19 hours the gels are removed from the acid and washed in methanol. The gels then are placed in large empty test tubes in an oven at 60° C. to dry for 2 days. The gels are dried for 1 more day at 100° C.

Next, the gels are heated at 5° C. per minute to 500° C, then at 10° C. per minute to 900° C., then at 5° C per minute to 1200° C., then at 25° C. per minute to 1450° C. At 1450° C., the resulting glass rods are removed from the furnace and cooled to room temperature. The heating is done in an oxygen atmosphere up to 900°, and in a helium atmosphere from 900° at 1450° C. See FIG. 2.

The resulting rods are 4.7mm in diameter and about 25mm long. They are transparent and free of defects. They have a nearly parabolic index of refraction gradient with a total index change of 0.007, and are suitable for making plane-faced rod lenses.

EXAMPLE 2

8.26ml of TMOS, 30.21ml of methanol, and 1.01ml of aqueous 0.1M hydrochloric acid are stirred for 30 minutes. 2.22ml of titanium isopropoxide, 3.09ml of aluminum di(sec-butoxide) acetoacetic ester chelate, and 0.836ml of germanium ethoxide are then added and the mixture is stirred for 2 hours. 4.38ml of water is then added, and the mixture is stirred for 10 minutes. The resulting solution is poured into test tubes, aged, leached, dried, and sintered as in Example 1. The leaching time is only 9 hours in this case, however. The resulting gradient-index glass rods have a nearly parabolic refractive index profile with a total index change of 0.0143 and a diameter of 4.7mm.

EXAMPLE 3

A solution prepared according to example 2 is poured into a single 25mm diameter teflon test tube. The rest of the processing is identical two Example 2 except that the gel is leached in 150ml of acid solution for 30 hours. The resulting glass rod is 8.1mm in diameter with an index change of 0.007.

EXAMPLE 4

9.73ml of TMOS, 31.43ml of methanol, and 1.19ml of 0.1M hydrochloric acid are mixed together for 30 minutes. 2.42ml of zirconium n-propoxide and 0.87ml of germanium ethoxide are then added and the mixture is stirred for 2 hours. 4.41ml of water is then added and the mixture is stirred for 10 to 15 minutes. The resulting solution is poured into molds and aged as in Example 1. The gels are leached for 7 hours in a 12.5% aqueous hydrochloric acid solution, and then are washed and dried as in Example 1. The dry gels are converted into gradient-index glass by heating at 100° C. per hour to 300° C. for 1 hour, heating at 50° C. per hour to 450° C, then at 5° C. per minute to 1350° C., then cooled to room temperature. The heating was done in an oxygen atmosphere up to 700° C., and in a helium atmosphere from 700° C. to 1350° C. The resulting gradient-index glass rods are similar to those produced in Example 1.

EXAMPLE 5

Gels are prepared in a manner similar to that of Example 4, except that a combination of boron and aluminum alkoxides are used instead of a germanium alkoxide in preparing the initial solution. The chemicals used are 8.12ml of TMOS, 31.83ml of methanol, 0.99ml of 0.1M aqueous hydrochloric acid, 2.45ml of zirconium n-propoxide, 1.98ml of triethyl borate, 1.58ml of aluminum di(sec-butoxide) acetoacetic ester chelate, and 4.68ml of water. The gels are treated similar to the ones in Example 4 and yield gradient-index glass rods of similar quality.

We claim:

1. A gradient-index glass having a generally parabolic index of refraction about a central axis and which is produced from a sol-gel consisting essentially of at least three oxide components which are silicon dioxide ($SiO_2$) and, an index modifying dopant generally uniformly decreasing radially outward from the axis and consisting of a metal oxide selected from the group consisting of titanium oxide ($TiO_2$) and zirconium oxide ($ZrO_2$) and at least one additional oxide element for gel modification selected from the group consisting of oxides of aluminum ($Al_2O_3$), boron ($B_2O_3$) and germanium ($GeO_2$), wherein said oxides are in an interconnected network and wherein the concentration of $SiO_2$ in the gel is between 60 and 98 mole percent of the total oxide content in the gel, the concentration of the index modifying dopant oxide in the gel is between 0.1 and 25 mole percent of the total oxide content in the gel, and the concentration of the additional metal oxide is less than 25 mole percent of the total oxide content in the gel.

2. The gradient-index glass according to claim 1 wherein the index modifying dopant is titanium oxide.

3. The gradient-index glass according to claim 1 wherein the gel modification metal oxide element is aluminum oxide.

4. The gradient-index glass according to claim 1 wherein the gel modification metal oxide element is aluminum oxide and germanium oxide.

5. The gradient-index glass according to claim 1 wherein the index modifying dopant is zirconium oxide.

* * * * *